(12) United States Patent
An et al.

(10) Patent No.: US 10,171,287 B2
(45) Date of Patent: Jan. 1, 2019

(54) MULTI-USER ANALYTICAL SYSTEM AND CORRESPONDING DEVICE AND METHOD

(71) Applicant: International Business Machines Corporation, Armonk, NY (US)

(72) Inventors: Wen Hao An, Beijing (CN); Liya Fan, Beijing (CN); Bo Gao, Beijing (CN); Chang Jie Guo, Beijing (CN); Xi Sun, Beijing (CN); Zhi Hu Wang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 829 days.

(21) Appl. No.: 13/863,511

(22) Filed: Apr. 16, 2013

(65) Prior Publication Data
US 2013/0282906 A1    Oct. 24, 2013

(30) Foreign Application Priority Data
Apr. 18, 2012 (CN) .......................... 2012 1 0114631

(51) Int. Cl.
*H04L 12/24* (2006.01)
*G06F 9/50* (2006.01)

(52) U.S. Cl.
CPC ............ *H04L 41/04* (2013.01); *G06F 9/5027* (2013.01); *G06F 2209/5013* (2013.01); *G06F 2209/5016* (2013.01); *G06F 2209/542* (2013.01)

(58) Field of Classification Search
CPC .... H04L 41/50; H04L 41/0893; H04L 41/509
See application file for complete search history.

(56) References Cited

U.S. PATENT DOCUMENTS

| 8,429,097 B1 * | 4/2013 | Sivasubramanian ........................ G06F 17/30483 706/12 |
| 2002/0010798 A1 * | 1/2002 | Ben-Shaul .......... G06F 17/3089 709/247 |

(Continued)

FOREIGN PATENT DOCUMENTS

| CN | 1533547 | 9/2004 |
| CN | 1869959 | 11/2006 |

(Continued)

OTHER PUBLICATIONS

Jan Schaffner et al, Towards Analytics-as-a-Service Using an In-Memory Column Database, Lecture Notes in Business Information Processing, 2011, vol. 74, Part 4, 257-282.

*Primary Examiner* — Philip J Chea
*Assistant Examiner* — Wuji Chen
(74) *Attorney, Agent, or Firm* — F. Chau & Associates, LLC

(57) ABSTRACT

The present invention relates to multi-user analytical system and corresponding device and method. The device includes an interception module configured to intercept a user's request for a first core object, wherein the first core object belongs to core object; a transformation module configured to create, in response to the request being a creation request, the first core object specific to the user; a mapping module configured to interpret, in response to the request being a non-creation request, the request as a request for the first core object specific to the user. The present invention also includes an isolation method for the multi-user analytical system. The technical solutions provided in the present invention can effectively enable multiple users to share physical resources in the analytical system, and the users are isolated from each other in a substantially transparent way.

16 Claims, 9 Drawing Sheets

(56) References Cited

U.S. PATENT DOCUMENTS

| | | | |
|---|---|---|---|
| 2003/0135609 A1 | 7/2003 | Carlson et al. | |
| 2004/0153637 A1* | 8/2004 | Harper | G06F 9/4416 713/1 |
| 2005/0091310 A1* | 4/2005 | Salomon | G06F 9/5077 709/203 |
| 2005/0262512 A1* | 11/2005 | Schmidt | G06F 9/465 719/310 |
| 2006/0246436 A1 | 11/2006 | Ohno et al. | |
| 2007/0124276 A1* | 5/2007 | Weissman | G06F 17/30442 |
| 2008/0243867 A1* | 10/2008 | Janedittakarn | G06F 17/30424 |
| 2008/0270459 A1* | 10/2008 | Grewal | G06F 17/30566 |
| 2008/0275939 A1* | 11/2008 | Martin | G06F 8/61 709/203 |
| 2009/0235324 A1* | 9/2009 | Griffin | G06F 21/53 726/1 |
| 2010/0063959 A1* | 3/2010 | Doshi | G06F 17/30575 707/618 |
| 2010/0077449 A1* | 3/2010 | Kwok | G06F 9/5027 726/3 |
| 2010/0153553 A1* | 6/2010 | Sheth | H04L 67/1095 709/226 |
| 2011/0126197 A1* | 5/2011 | Larsen | H04L 9/3213 718/1 |
| 2011/0138055 A1* | 6/2011 | Daly | G06F 9/505 709/226 |
| 2011/0238838 A1* | 9/2011 | Avalani | G06F 9/5011 709/226 |
| 2011/0276579 A1* | 11/2011 | Colrain | G06F 17/30557 707/756 |
| 2011/0302133 A1* | 12/2011 | Kuruganti | G06F 17/30557 707/608 |
| 2011/0318011 A1* | 12/2011 | Brassil | H04J 14/02 398/82 |
| 2012/0011518 A1* | 1/2012 | Duan | G06F 9/505 718/104 |
| 2012/0016721 A1* | 1/2012 | Weinman | G06Q 10/06 705/7.35 |
| 2012/0066020 A1* | 3/2012 | Moon | G06Q 10/0635 705/7.28 |
| 2012/0110020 A1* | 5/2012 | Weissman | G06F 21/6227 707/783 |
| 2012/0254258 A1* | 10/2012 | Gao | G06F 17/30289 707/803 |
| 2012/0260259 A1* | 10/2012 | Parthasarathy | G06F 9/5005 718/104 |
| 2014/0207740 A1* | 7/2014 | Narasayya | G06F 17/30501 707/688 |
| 2014/0330869 A1* | 11/2014 | Factor | G06F 21/6218 707/783 |

FOREIGN PATENT DOCUMENTS

| | | |
|---|---|---|
| CN | 101510888 | 8/2009 |
| CN | 101588366 | 11/2009 |
| EP | 1533373 A1 | 5/2005 |
| JP | 2004000018 | 1/2004 |
| WO | 03097830 | 11/2003 |

* cited by examiner

MULTI-USER ANALYTICAL SYSTEM AND CORRESPONDING DEVICE AND METHOD

CROSS-REFERENCE TO RELATED APPLICATION

This application claims priority under 35 U.S.C. § 119 from Chinese Patent Application No. 201210114631.7 filed Apr. 18, 2012, the entire contents of which are incorporated herein by reference.

BACKGROUND OF THE INVENTION

The present invention relates to a field of data analysis and a field of multi-user data analysis. More specifically, a multi-user analytical system and a corresponding device and a corresponding isolation method for the multi-user analytical system.

For a typical data analytical system, in particular, an enterprise level data analytical system, normally, it is necessary to purchase analytical software licenses, high performance computing servers and a large number of data storage systems. Accordingly, it is necessary to invest a large amount of fund even in the initial phase for building an enterprise level data analytical system. Even if a user does not need to conduct a data analysis for a long term, he has to invest a large amount of fund. Therefore, it is difficult for many users to afford such a fund requirement.

In order to solve the problem of investing a large amount of fund required in the initial phase of a project, some independent software providers propose a concept of Software as a Service (SaaS), providing a traditional data analytical system to a user as a service. That is, analysis service providers provide software and hardware platforms required by the data analysis, and users purchase the analysis service as needed, thereby reducing investment of a large amount of fund required in the initial phase of a project.

However, traditional analysis service providers create a virtual machine for each user, including analytical software, management server, execution server, and storage server, etc. Even in a gap where use of the analysis service by the user is paused, such a complete virtual machine has to be reserved for the user, which causes a cost problem for analysis service providers. For analysis service providers, since sharing between multiple users cannot be achieved, a large amount of hardware and software are needed, thereby leading to a waste of resource.

In order to reduce the cost and provide users with the analysis service with a lower price and more diverse options, an analysis platform shared by multiple users is desired urgently.

SUMMARY OF THE INVENTION

In order to enable multiple users to share analytical system resources, the present invention provides a device for a multi-user analytical system, a multi-user analytical system and an isolation method for the multi-user analytical system.

Accordingly, one aspect of the present invention provides a device for a multi-user analytical system, the device including: a scoring server; an analytical server; a storage device; and a device including: an interception module configured to intercept a user's request for a first core object, wherein the first core object belongs to core object, the core object comprising at least one of an analytical job and a scoring job executed in the multi-user analytical system, user data, an analytical stream, a predictive model, an analytical job configuration and a scoring job configuration processed in the multi-user analytical system; a transformation module configured to create the first core object specific to the user in response to the request being a creation request; and a mapping module configured to interpret the request as a request for the first core object specific to the user in response to the request being a non-creation request.

Another aspect of the present invention provides a multi-user analytical system, the system wherein the first core object specific to the user contains references to other core objects specific to the user.

Another aspect of the present invention includes an isolation method for a multi-user analytical system, the method including: intercepting a user's request for a first core object, wherein the first core object belongs to core object, the core object comprising at least one of an analytical job and a scoring job executed in the multi-user analytical system, user data, an analytical stream, a predictive model, an analytical job configuration and a scoring job configuration processed in the multi-user analytical system; creating the first core object specific to the user if the request is a creation request; and interpreting the request as a request for the first core object specific to the user if the request is a non-creation request.

The technical solutions provided in the present invention can enable multiple users to share the analytical system resources and the users are isolated from each other in a transparent way.

DETAILED DESCRIPTION OF THE PREFERRED EMBODIMENTS

Figure 1:
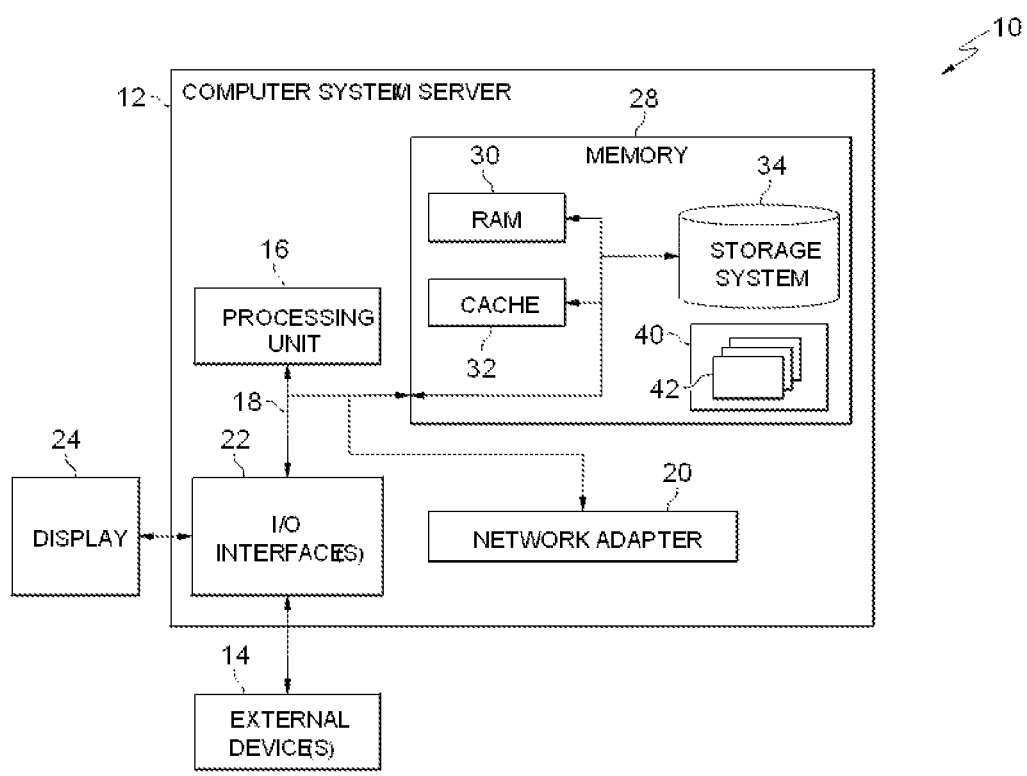
FIG. 1 depicts a cloud computing node according to an embodiment of the present invention.

The preferred embodiments will be described in greater detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources such as networks, network bandwidth, servers, processing, memory, storage, applications, virtual machines, and services that can be rapidly provisioned and released with minimal management effort or interaction with a provider of the service. This cloud model can include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms such as mobile phones, laptops, and personal digital assistants.

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction such as country, state, or datacenter.

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service such as storage, processing, bandwidth, and active user accounts. Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser or a web-based e-mail. The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components such as host firewalls.

Deployment Models are as Follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns such as mission, security requirements, policy, and compliance considerations. It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds such as private, community, or public that remain unique entities but are bound together by standardized or proprietary technology that enables data and application portability such as cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and performing any of the functionality set forth hereinabove.

In cloud computing node 10 there is a computer system/server 12, which is operational with numerous other general purpose or special purpose computing system environments or configurations. Examples of well-known computing systems, environments, and/or configurations that can be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 can be described in the general context of computer system-executable instructions, such as program modules, being executed by a computer system. Generally, program modules can include routines, programs, objects, components, logic, data structures, and so on that perform particular tasks or implement particular abstract data types. Computer system/server 12 can be practiced in distributed cloud computing environments where tasks are performed by remote processing devices that are linked through a communications network. In a distributed cloud computing environment, program modules can be located in both local and remote computer system storage media including memory storage devices.

As shown in FIG. 1, computer system/server 12 in cloud computing node 10 is shown in the form of a general-purpose computing device. The components of computer system/server 12 can include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media which are not shown and typically called a "hard drive". Although not shown, a magnetic disk drive for reading from and writing to a removable, non-volatile magnetic disk such as a "floppy disk", and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 can include at least one program product having a set of at least one of program modules that are configured to carry out the functions of embodiments of the invention.

Program/utility 40, having a set of at least one of program modules 42, can be stored in memory 28 by way of example, and not limitation, as well as an operating system, one or more application programs, other program modules, and program data. Each of the operating system, one or more application programs, other program modules, and program data or some combination thereof, can include an implementation of a networking environment. Program modules 42 generally carry out the functions and/or methodologies of embodiments of the invention as described herein.

Computer system/server 12 can also communicate with one or more external devices 14 such as a keyboard, a pointing device, a display 24, etc.; one or more devices that enable a user to interact with computer system/server 12; and/or any devices such as network card, modem, etc. that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network such as the Internet via network adapter 20. As depicted, network adapter 20 communicates with the other components of computer system/server 12 via bus 18. It should be understood that although not shown, other hardware and/or software components can be used in conjunction with computer system/server 12. Examples, include, but are not limited to: microcode, device drivers, redundant processing units, external disk drive arrays, RAID systems, tape drives, and data archival storage systems, etc.

Figure 2:
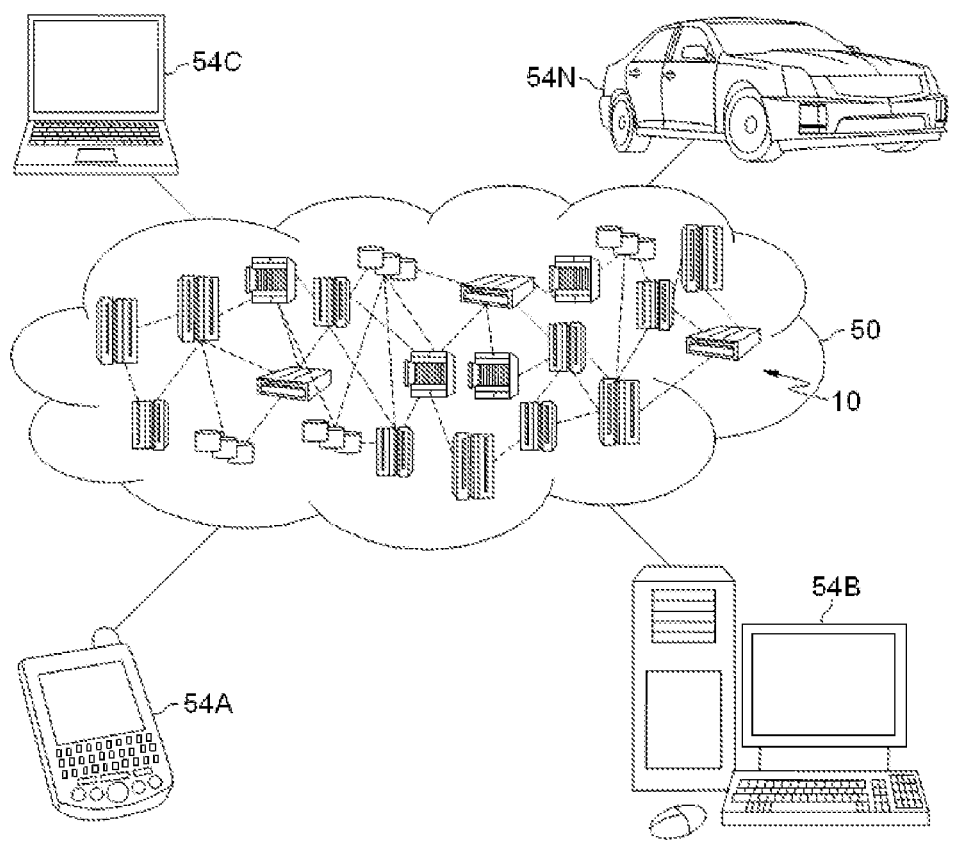
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. While it is not shown here, they can be grouped physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection such as using a web browser.

Figure 3:
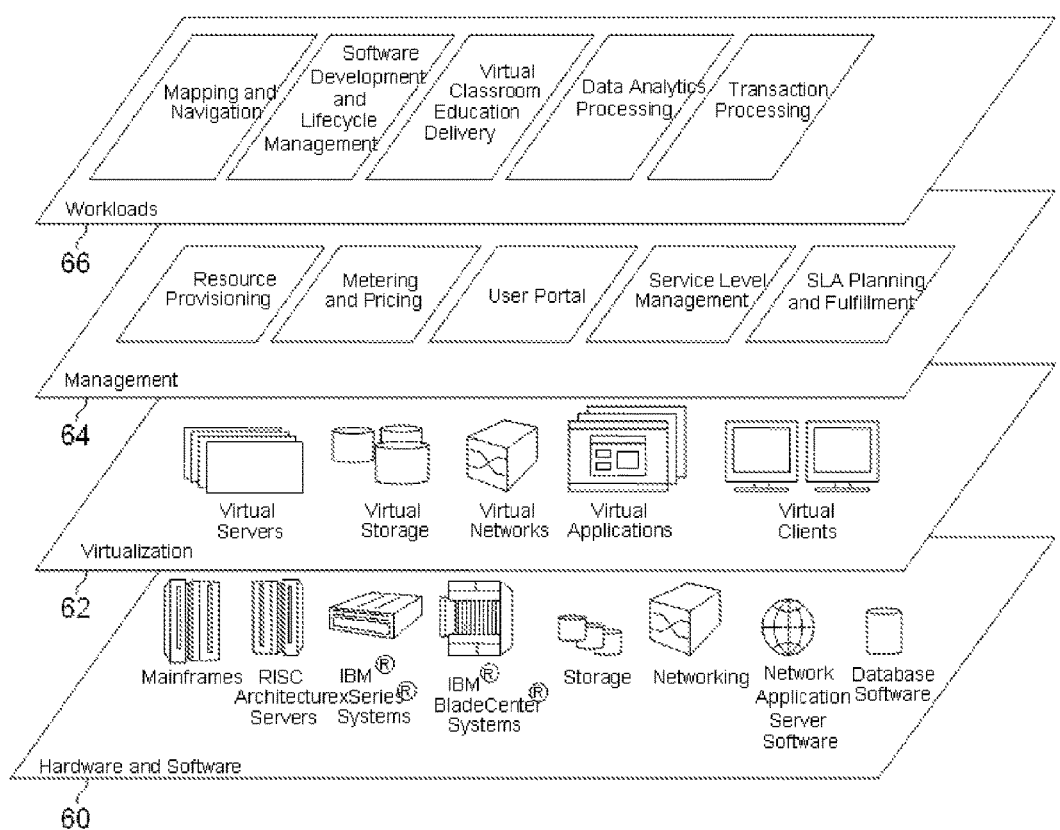
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities can be provided: virtual servers; virtual storage; virtual networks, including virtual private networks; virtual applications and operating systems; and virtual clients.

In one example, management layer 64 can provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources can comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment can be utilized. Examples of workloads and functions which can be provided from this layer include: mapping and navigation; software development and lifecycle management; virtual classroom education delivery; data analytics processing; transaction processing.

Figure 4:
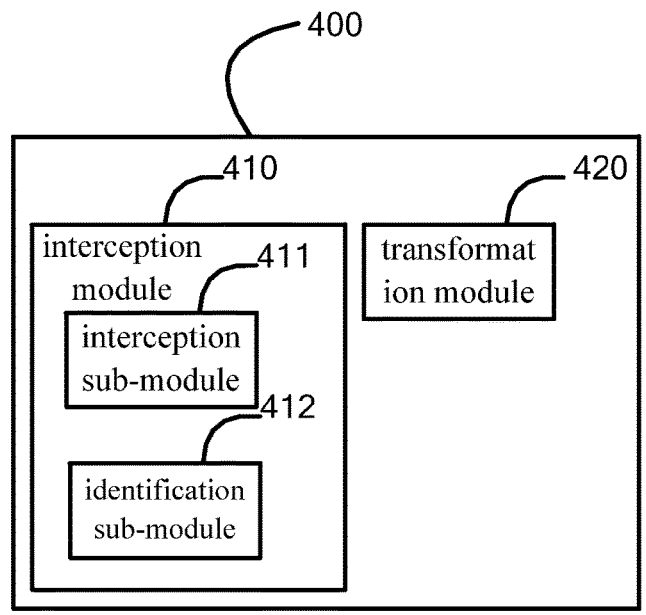
FIG. 4 depicts a structure example of a device for a multi-user analytical system according to an embodiment of the present invention.

With reference now to FIG. 4, a detailed description of embodiments of the present invention is given. FIG. 4 depicts a device 400 for a multi-user analytical system. The device typically comprises an interception module 410 and a transformation module 420. The interception module 410 is configured to intercept users' requests for a core object; and the transformation module 420 is configured to create a user-specific core object.

In an embodiment of the present invention, the core object comprises at least one of Analytical Job and Scoring Job executed in the multi-user analytical system, User Data processed by said multi-user analytical system, Analytical Stream, Predictive Model, Analytical Job Configuration and Scoring Job Configuration.

In an embodiment of the present invention, in order to isolate multiple users better, core objects comprise, for example, the above-mentioned 7 kinds of objects. In the present embodiment and each of the following embodiments, it is possible to classify core objects into core objects to be permanently stored and core objects to be only present at runtime. User data, analytical streams, predictive models, analytical job configurations and scoring job configurations belong to core objects to be permanently stored; and analytical jobs and scoring jobs belong to core objects to be only present at runtime. It is also possible to classify core objects into analytical objects and scoring objects. Training data in user data, analytical streams, analytical job configurations and analytical jobs belong to analytical objects; and input data in user data, predictive models, scoring job configurations and scoring jobs belong to scoring objects.

For example, it is possible to provide the interception module 410 according to an embodiment of the present invention at the interface of an analysis management server to intercept requests with respect to the above-mentioned core objects. Or, it is also possible to provide the interception module 410 in the analysis management server to intercept requests with respect to core objects before processes, such as creation, query, etc., are performed on core objects.

For example, when a user issues a request for creation of an analytical job, since the request for creation is related to a core object, the interception module 410 will intercept the request. For example, when a user wants to configure the analytical job, he will issue a request for creation of the analytical job configuration. Likewise, since this request is related to a core object, the interception module 410 will also intercept the request.

In the present embodiment, the interception module 410 will not intercept requests not related to a core object. For example, if a request is for addition of a background analysis server, since the request is not related to a core object, the interception module 410 will not intercept the request. There are many requests not related to a core object, e.g., other requests for background maintenance, which are not described in detail here.

In the present embodiment, the interception module 410 can, for example, include: an interception sub-module 411 for intercepting all requests; an identification sub-module 412 for identifying whether a request intercepted by the interception sub-module 411 is one related to a core object, wherein if yes, it schedules subsequent modules for further processing, and if not, it abandons the request. Of course, this is only one implementation of the interception module 410, and there are also other implementations of the interception module 410. For example, the interception module 410 is arranged at a location where all the intercepted requests are requests related to core objects, or the interception module 410 can determine the type of a request and only intercept requests related to core objects, etc.

In the present embodiment, interception of requests for core objects can be interception of requests issued by users, or can also be interception of requests for core objects generated in the execution of an analytical job or in the execution of a scoring job, or can also be interception of requests for core objects in other cases.

Specifically, after the interception module 410 intercepts requests related to core objects, the transformation module 420 will attach a user identifier to a user-specific core object in creating the user-specific core object. For example, if a user A makes a request for creation of a scoring job configuration, after the interception module 410 intercepts the request, the transformation module 420 will create a scoring job configuration named A_modelQ_config, which is specific to the user A. Of course, this is only one implementation of creating a user-specific core object by the transformation module 420. According to the above description, those skilled in the art can devise other implementations of creating user-specific core objects, e.g., attaching a specific storage path to a core object.

With the device 400 including the interception module 410 and the transformation module 420, it is possible to create various user-specific core objects for the multi-user analysis platform, thereby achieving isolation of users from each other, so that multiple users can share an analysis platform, for example, share a scoring server, an analytical server or a storage server. Also, the application of the device 400 can ensure that multiple users are transparent to each other such that users do not affect each other and so that real isolation of users from each other can be achieved while users share resources.

Figure 5:
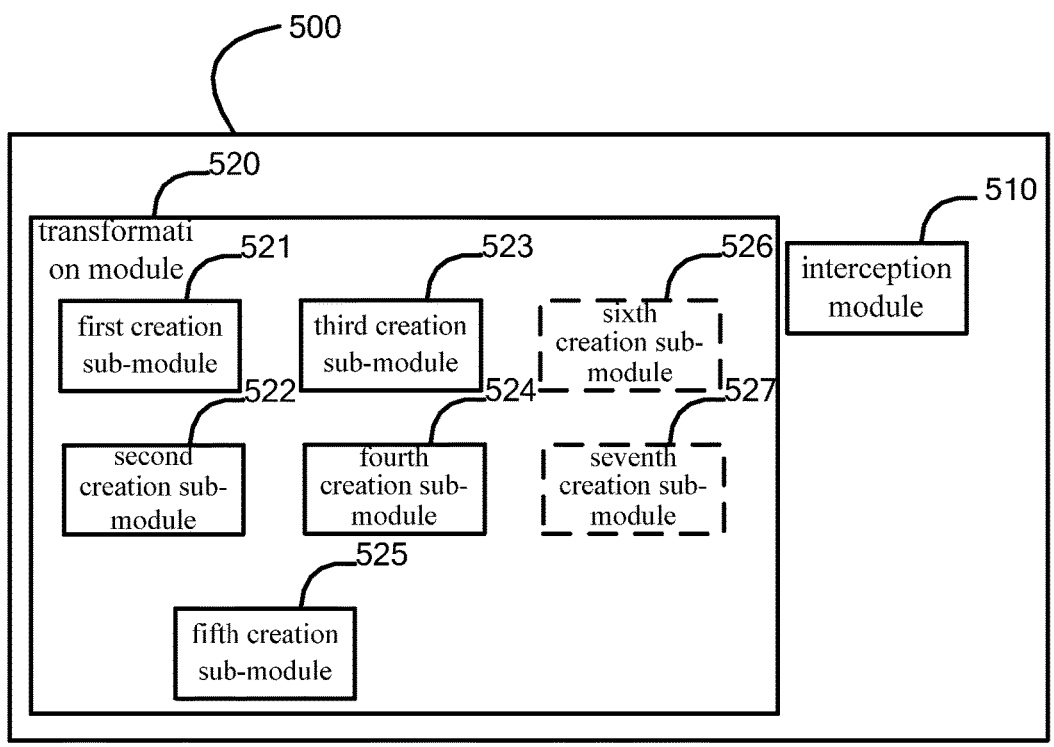
FIG. 5 depicts a structure example of a device for a multi-user analytical system according to an embodiment of the present invention.

Further, in order to improve user isolation, an embodiment of the present invention also provides a device 500 for a multi-user analytical system as shown in FIG. 5. The device comprises an interception module 510 and a transformation module 520. The description of the interception module 510 can refer to the interception module 410 shown in FIG. 4, which is not repeated here. The transformation module 520 can create, in response to a reference relationship between the core object to which the request is related and other core objects, a user-specific core object, the user-specific core object containing reference to other core objects specific to the user.

In the present embodiment, the above reference relationship includes, for example, one of or any combination of:

reference to the analytical job configuration and the predictive model by the analytical job, reference to the analytical stream by the analytical job configuration, reference to the user data by the analytical stream, reference to the predictive model by the scoring job configuration, and reference to the scoring job configuration and the user data by the scoring job.

Accordingly, the transformation module 520, for example, can comprise one of or any combination of the following sub-modules: a first creation sub-module 521 configured to create, in response to the intercepted request being a creation request and the core object to which the intercepted request is related being the analytical job and in response to the reference relationship between the analytical job and other core objects, a user-specific analytical job, wherein the user-specific analytical job contains reference to the user-specific analytical job configuration and the user-specific predictive model; a second creation sub-module 522 configured to create, in response to the intercepted request being a creation request and the core object to which the intercepted request is related being the analytical job configuration and in response to the reference relationship between the analytical job configuration and other core objects, a user-specific analytical job configuration, wherein the user-specific analytical job configuration contains reference to the user-specific analytical stream; a third creation sub-module 523 configured to create, in response to the intercepted request being a creation request and the core object to which the intercepted request is related being the analytical stream and in response to the reference relationship between the analytical stream and other core objects, a user-specific analytical stream, wherein the user-specific analytical stream contains reference to the user-specific user data; a fourth creation sub-module 524 configured to create, in response to the intercepted request being a creation request and the core object to which the intercepted request is related being the scoring job and in response to the reference relationship between the scoring job and other core objects, a user-specific scoring job, wherein the user-specific scoring job contains reference to the user-specific user data and the user-specific scoring job configuration; and a fifth creation sub-module 525 configured to create, in response to the intercepted request being a creation request and the core object to which the intercepted request is related being the scoring job configuration and in response to the reference relationship between the scoring job configuration and other core objects, a user-specific scoring job configuration, wherein the user-specific scoring job configuration contains reference to the user-specific predictive model.

Taking the core object to which the request is related being an analytical job configuration as an example, the second creation sub-module 522 will be described in more detail. Those skilled in the art can learn the particular way other creation sub-modules 521-525 work according to the detailed description of the second creation sub-module 522. After the interception module 510 intercepts a user A's request for an analytical job configuration, the second creation sub-module 522 creates an analytical job configuration A_jobQ specific to user A, and creates reference to an analytical stream in A_jobQ as reference to the analytical stream specific to the user A, for example, A_jobQ refer to A_streamP.

Also, taking the core object to which the request is related being an analytical stream as an example, the third creation sub-module 523 will be described in more detail. Those skilled in the art can learn the particular way other creation sub-modules 521-525 work according to the detailed description of the third creation sub-module 523. After the interception module 510 intercepts a user B's request for creation of an analytical stream, the third creation sub-module 523 creates an analytical job configuration B_streamF specific to user B, and creates reference to user data in B_streamF as reference to the user data specific to user B, for example, the storage path of user data is modified to point to the storage path of the user data specific to user B.

In addition, the transformation module 520 can further comprise a sixth creation sub-module 526 and a seventh creation sub-module 527. The sixth creation sub-module 526 is configured to create, in response to the intercepted request being a creation request and the core object to which the intercepted request is related being user data, user-specific user data; and the seventh creation sub-module 527 is configured to create, in response to the intercepted request being a creation request and the core object to which the intercepted request is related being the predictive model, a user-specific predictive model.

The embodiment shown in FIG. 5 can be combined with the embodiment shown in FIG. 4. For example, according to the relationship between core objects, the transformation module can employ various creation methods to create user-specific core objects.

Figure 6:
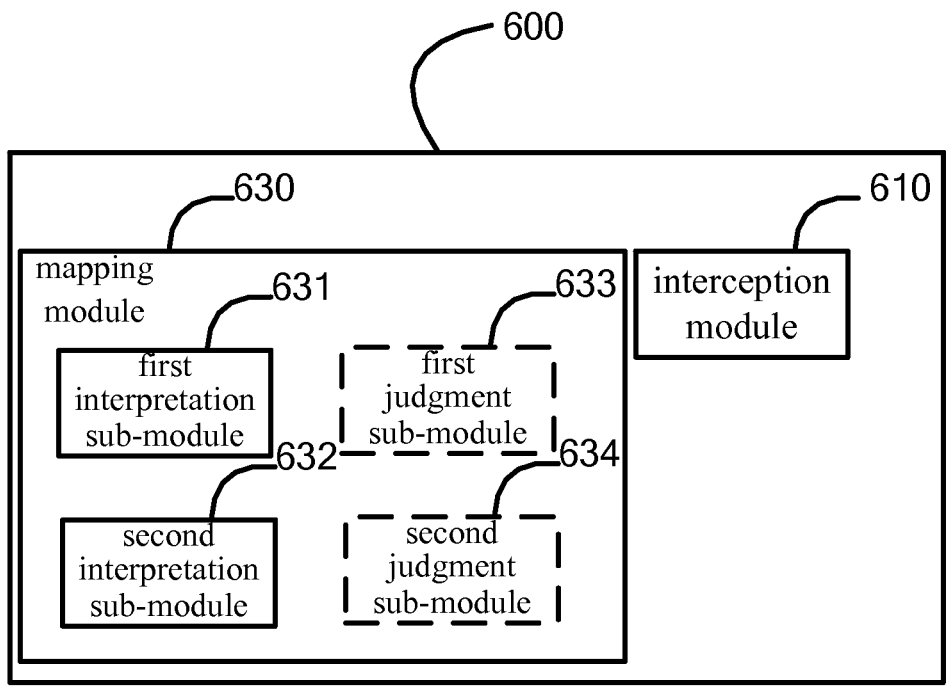
FIG. 6 depicts a structure example of a device for a multi-user analytical system according to an embodiment of the present invention.

As shown in FIG. 6, a device 600 for a multi-user analytical system can comprise an interception module 610 and a mapping module 630. The interception module 610 can be implemented with reference to the interception module 410 in the embodiment shown in FIG. 4, and its detailed implementation will not be described here. The mapping module 630 is configured to interpret, in response to the intercepted request being a non-creation request, the request as a request for the user-specific core object corresponding to the request.

Specifically, the mapping module 630 can interpret the request as a request for the user-specific core object corresponding to the request by converting the name of the core object to which the request is related into the name of the user-specific core object. For example, the mapping module 630 can convert the name of the core object to which the request is related into the name of the user-specific core object by attaching a user identifier to the name of the core object, or can also attach a specific storage path to the name of the core object to which the request is related, so as to convert the name of the core object into the name of the user-specific core object.

Specifically, the mapping module 630 can also interpret the request as a request for the user-specific core object corresponding to the request by filtering.

The mapping module 630 can interpret the request as a request for the user-specific core object corresponding to the request, according to the intercepted request and the user identifier of the user corresponding to the request. For example, the mapping module 630 can look up a list according to the user identifier to obtain the user-specific core object corresponding to the core object to which the request is related, thereby interpreting the request as a request for the user-specific core object. For example, the mapping module 630 can attach the user identifier to the core object to which the request is related, in turn to obtain the user-specific core object, thereby interpreting the request as a request for the user-specific core object. For example, the mapping module 630 can invoke the original API (Application Programming Interface) to obtain feedback information, and the feedback information contains a core object.

The core object is filtered according to the user identifier to obtain the user-specific core object corresponding to the request.

As shown in FIG. 6, the mapping module 630 can in particular comprise a first interpretation sub-module 631 and/or a second interpretation sub-module 632. The first interpretation sub-module 631 is configured to convert, in response to the intercepted request being neither a creation request nor a list query request, the core object to which the request is related into the user-specific core object corresponding to the request; and the second interpretation sub-module 632 is configured to filter, in response to the intercepted request being a list query request, core objects contained in the feedback information of the request so as to obtain the user-specific core object corresponding to the request. For example, the first interpretation sub-module 631 can interpret the core object as the user-specific core object by modifying the name of the core object. In this way, when the original API is invoked, corresponding operations are directly performed according to the name of the user-specific core object.

Hereinafter, taking querying an analytical job configuration by a user B as an example, the first interpretation sub-module 631 will be described in detail. The user B issues a request for querying the analytical job configuration, the interception module 610 intercepts the request, and the first interpretation sub-module 631 converts the object jobQ to which the request is related into the analytical job configuration B-jobQ specific to user B. Specifically, conversion of the core object by the first interpretation sub-module 631 can be done by a method for querying a list or according to preset rules. For a user's delete request or update request, the corresponding interpretation process can also be performed by the first interpretation sub-module 631. Subsequently, corresponding processes can be performed, for example, by invoking the original API. In the present embodiment and the following various embodiments, the original API is the API that is required to be invoked to process a corresponding request in an existing analytical system. For example, in the SPSS analytical system, when a scoring configuration is queried, the method queryResource( ) of the ContentRepository service will be invoked, which is an example of the original API in an embodiment of the present invention.

Hereinafter, taking querying a list of predictive modules by the user B as an example, the second interpretation sub-module 632 will be described in detail. The user B issues a list query request for querying all of its the predictive modules, the interception module 610 intercepts the request, and the second interpretation sub-module 632 filters core objects contained in the feedback information of the list query request so as to obtain a list of the user B's all predictive modules. For example, the filtering can be done according the name of the core object; for example, the feedback information can be obtained by invoking the original API. Since the feedback information is obtained by directly invoking the original API with respect to the intercepted request, core objects contained in the feedback information can be not only the user B's core objects, but also include other users' core objects. Thus, they need to be filtered.

Furthermore, the mapping module 630 can further include a first judgment sub-module 633 and/or a second judgment sub-module 634. The first judgment sub-module 633 is used to, when the request intercepted by the interception module 610 is a first request, schedule the first interpretation sub-module 631 for processing. The second judgment sub-module 634 is used to, when the request intercepted by the interception module 610 is a second request, schedule the second interpretation sub-module 632 for processing. The first request includes a query request, a delete request or an update request for any one of the analytical stream, the user data, the analytical job configuration, the predictive model, the scoring job configuration; or the first request includes a state query request or an execution request for the scoring job or the analytical job. The second request includes a list query request for any one of the analytical stream, the user data, the analytical job configuration, the predictive model, the scoring job configuration, the analytical job or the scoring job. In the present embodiment, it is also possible that the first judgment sub-module 633 and the second judgment sub-module 634 are not included and that the first interpretation sub-module 631 and the second interpretation sub-module 632 directly perform processing in response to corresponding requests.

In the present embodiment, when the mapping module 630 includes the first judgment sub-module 633 and the second judgment sub-module 634, the functions of these two judgment sub-modules can be merged into one judgment sub-module. That is, the merged judgment sub-module is used to schedule the first interpretation sub-module 631 for processing when the request intercepted by the interception module 610 is the first request, and to schedule the second interpretation sub-module 632 for processing when the request intercepted by the interception module 610 is the second request.

The device 600 provided in the present embodiment can effectively interpret a user's request for a core object as a request for the user-specific core object, thereby achieving isolation of users from each other so that multiple users can be isolated from each other and share analytical resources. The software and hardware resources of the service provider will then be utilized sufficiently, the cost of the service provider is reduced, and users' fees can be reduced at the same time.

Figure 7:
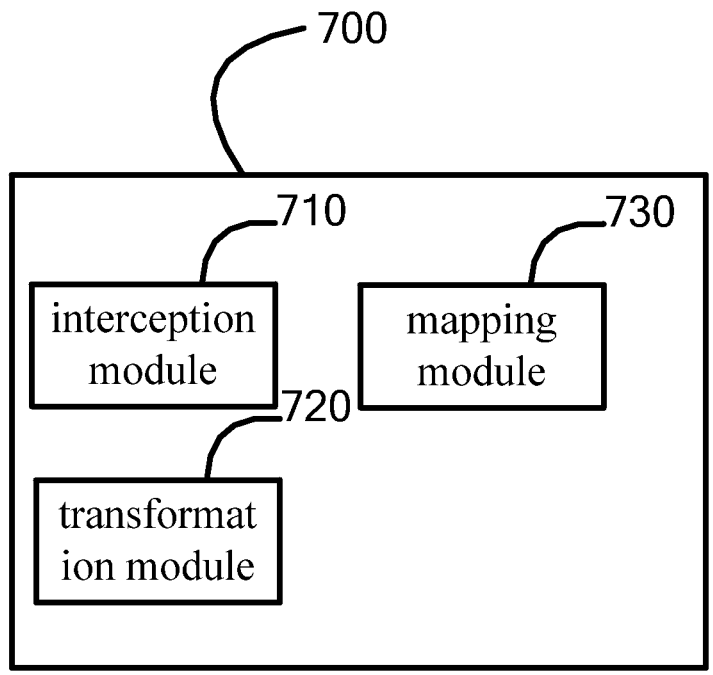
FIG. 7 depicts a structure example of a device for a multi-user analytical system according to an embodiment of the present invention.

As shown in FIG. 7, an embodiment of the present invention provides a device 700 for a multi-user analytical system. The device 700 comprises an interception module 710, a transformation module 720 and a mapping module 730. Description of the interception module 710 can refer to that of the interception module 410 in the embodiment shown in FIG. 4, description of the transformation module 720 can refer to that of the transformation modules 420, 520 in the embodiments shown in FIGS. 4 and 5, and description of the mapping module 730 can refer to that of the mapping module 630 in the embodiment shown in FIG. 6.

In the present embodiment, when the device 700 intercepts all the requests related to core objects and performs corresponding processing and core objects comprise the above-mentioned 7 kinds of core objects, the transparent isolation between users can be achieved optimally.

With the device 700 provided in the embodiment of the present invention, through creation of the user-specific core object and interpretation of a request as a request for the user-specific core object, users can share analytical resources. Each user does not need to issue a request for his own core object, but still issues an original request as if in the prior art where each user has his own complete virtual machine. That is, the device 700 can achieve substantially completely transparent isolation between users. Thereby, no difficulty in use is added to users, and they feel good.

Figure 8:
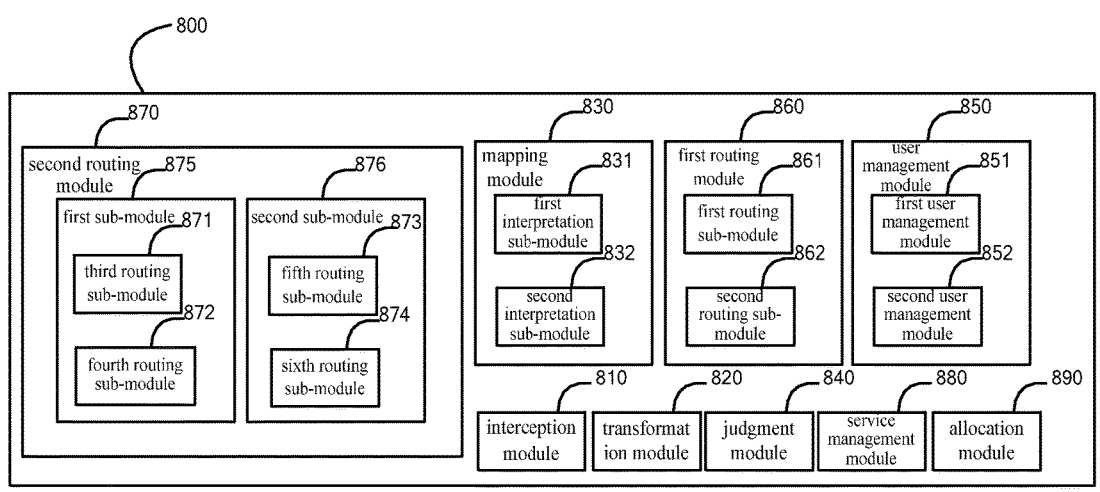
FIG. 8 depicts a structure example of a device for a multi-user analytical system according to an embodiment of the present invention.

As shown in FIG. 8, an embodiment of the present invention provides a device 800 for a multi-user analytical system. The device 800 comprises an interception module 810, a transformation module 820, a mapping module 830, and a user management module 850. Description of the interception module 810, the transformation module 820 and the mapping module 830 can refer to those of modules with the same names in the above embodiments, which is not repeated here.

The user management module 850 is configured to generate user context and attach the user context to the request of the user corresponding to the user context. Or the user management module 850 is configured to generate user context and store the user context. When other modules need the user context, they can obtain needed user context from the user management module. In the present embodiment, the user context can include for example a user's user identifier. The user identifier is for example an identifier that can uniquely identify the user. For example, the user identifier can be for example the user's user name, or an ID number, or a unique identifier allocated by the system.

It has been mentioned in the above embodiment that the transformation module can for example attach a user identifier to the core object in creating a user-specific core object. In the present embodiment, if the user management module 850 directly attaches the user context containing user identifier to the user' request, the transformation module 820 can directly know the user identifier according to the user' request with the user identifier attached, thereby attaching the user identifier to the core object in creating the user-specific core object. If the user management module 850 stores a user context containing user identifier, the transformation module 820 can query a corresponding user identifier from the user management module 850 and attach the user identifier to a core object. Or the user management module 850 can broadcast the user context, the transformation module 820 saves the corresponding user context, thereby knowing the corresponding user identifier.

In the present embodiment, the mapping module 830 can obtain the user identifier contained in user context according to the user context attached to user' request, or it is possible to query and get user identifier from the user management module 850, or it is also possible to obtain user identifier according to user context containing user identifier broadcast by the user management module 850.

It can be seen from the above implementations that attaching user context to the user' request is a preferable implementation. This is because after the user context is attached to the user' request, other modules can directly obtain information carried in the user context according to the user' request, so that communication between other modules is avoided.

The embodiment of the present invention can further comprise a first routing module 860 and a second routing module 870. The first routing module 860 is configured to store user-specific core objects created by the transformation module 820 in a corresponding storage or route them to a corresponding server. The second routing module 870 comprises at least one of a first sub-module 875 and a second sub-module 876. The first sub-module 875 is configured to route the requests interpreted by a first interpretation sub-module 831 to corresponding servers or storages; and the second sub-module 876 is configured to route requests intercepted by the interception module 810 to corresponding servers or storages and route feedback information to a second interpretation sub-module 832.

Specifically, the first routing module 860 comprises: a first routing sub-module 861 configured to store user-specific core objects to be permanently stored and created by the transformation module 820 in corresponding storages; and a second routing sub-module 862 configured to send user-specific core objects to be only present at runtime and created by the transformation module 820 to corresponding servers. The first sub-module 875 comprises: a third routing sub-module 871 for routing requests for core objects to be permanently stored and interpreted by the first interpretation sub-module 831 to corresponding storages; and a fourth routing sub-module 872 for routing requests for core objects to be only present at runtime and interpreted by the first interpretation sub-module 831 to corresponding servers. The second sub-module 876 comprises: a fifth routing sub-module 873 for routing requests for core objects to be permanently stored and intercepted by the interception module 810 to corresponding storages and routing feedback information to the second interpretation sub-module 832; and a sixth routing sub-module 874 for routing requests for core objects to be only present at runtime and intercepted by the interception module 810 to corresponding servers and routing feedback information to the second interpretation sub-module 832.

In the present embodiment, the user context can also include a user's metadata, for example. For example, the metadata can include configuration information of the isolation policy used for the user's at least one kind of core object. In the present embodiment, if the metadata includes only configuration information of the isolation policies used for some kinds of core objects, configuration information of the isolation policies used for other kinds of core objects can be for example default configuration or common configuration. For example, if a user A's isolation policy includes the user A's analytical stream should be saved to a dedicated data table in a shared database, the user A's metadata can include, for example, a dedicated database table used by the analytical stream, the name of the database where the database table is located, the user's user name and password for the database system.

In the present embodiment, the user management module 850 comprises, for example, a first user management module 851 and/or a second user management module 852. The first user management module 851 is configured to generate user context of a user and attach the user context to request corresponding to the user, said user context including user identifier of the user. The second user management module 852 is configured to generate a second user context of the user and attach the second user context to request corresponding to the user, said second user context including metadata of the user. Of course, the functions of the first user management module 851 and the second user management module 852 can be integrated. That is, the user management module 850 is configured to generate user context of a user and attach the user context to request corresponding to the user, the user context including user identifier and metadata of the user.

Specifically, the first routing module 860 can route core objects created by the transformation module 820 to corresponding servers or storages according to configuration information of isolation policies. Specifically, it is possible to obtain configuration information of isolation policies according to metadata contained in user context. For example, the metadata of user A includes: the user A exclusively using a database system M, the name of the database system and the user A's user name and password for the database system. If the user's request is for creation of the user A's analytical stream, after the transformation module 820 creates the user A-specific analytical stream, the first routing module 860 will send the user A-specific analytical stream to the database system M for storage. In another example, the metadata of user A includes: the user A exclusively using an analytical server N and the address of the analytical server. If the user's request is for creation of the user A's analytical job, after the transformation module 820 creates the user A-specific analytical job, the first routing module 860 will send the user A-specific analytical job to the server N.

Specifically, the first sub-module 875 can also route requests interpreted by the mapping module 830 to corresponding servers or storages according to configuration information of isolation policies. The second sub-module 876 can route requests intercepted by the interception module 810 to corresponding servers or storages, and route feedback information to the mapping module 830, according to configuration information of isolation policies.

In the present embodiment, various isolation policies are provided. In order to enable a user to select isolation policies suitable for his requirements more easily, an embodiment of the present invention also provides a service management module 880 for user registration. For example, the service management module 880 can provide a registration service of isolation policies for users. Specifically, it is possible to perform the registration of isolation policies by providing users with an interface containing options. For example, description of the user's requirement includes: performance requirement in a training phase, data security requirement in a training phase, performance requirement in a scoring phase, data security requirement in a scoring phase.

Regarding description of each kind of user requirement, the interface can for example give different levels of options. Generally, 4 levels can be included. Of course, the above description of the user requirement is relatively detailed and corresponding levels are divided relatively finely. More rough description and level division can be employed. For example, the user's requirement can include only requirement in a training phase and requirement in a scoring phase, and corresponding levels can be divided into three levels of high, intermediate, and low. In this way, those skilled in the art can also derive other description of the user's requirement and division of levels.

Hereinafter, taking the case of the above relatively detailed user description and the relatively fine level division as an example, the service management module 880 is described in detail. The service management module 880 shows to a user an interface including user requirement description and corresponding level options. The interface includes: performance requirement in a training phase and corresponding level options 1, 2, 3, 4; data security requirement in a training phase and corresponding level options 1, 2, 3, 4; performance requirement in a scoring phase and corresponding level options 1, 2, 3, 4; data security requirement in a scoring phase and corresponding level options 1, 2, 3, 4. For example, 1 represents the highest performance requirement or the highest data security requirement, 4 represents the lowest performance requirement or the lowest data security requirement. In the present embodiment, the display of the interface can be done in response to a user's registration request, and can also be done in response to scheduling by other modules, and the present invention is not limited to this.

User A makes a corresponding selection in the interface. For example, user A selects 3 for performance requirement in a training phase, selects 2 for data security requirement in a training phase, selects 2 for performance requirement in a scoring phase, and selects 1 for data security requirement in a scoring phase. In response to such selections, the service management module 880 will allocate an isolation policy A_Policy to the user. A_Policy is for example: the user's analytical job uses shared analytical server physical resources and shared analytical server instances, core objects except the analytical job among the user's analytical objects use dedicated data tables in shared database systems for storage, the user's scoring job uses shared scoring server physical resources and dedicated scoring server instances, core objects except the scoring job among the user's scoring objects use independent database systems for storage. The above description is made when a database system is used as storage. Those skilled in the art can understand that other storages, such as a file system, can also be employed.

In the present embodiment, regarding the performance requirement, for example, different levels can be distinguished as follows: using dedicated server physical resources, using shared server physical resources and dedicated server instances, using shared server physical resources and shared server instances and distinguishing among different users, using shared server physical resources and shared server instances and not distinguishing among different users. Regarding the data security requirement, for example, different levels can be distinguished as follows: using a dedicated database system, using a shared database system and dedicated data tables, using a shared database system and shared data tables and distinguishing among different users, using a shared database system and shared data tables and not distinguishing among different users. If a file system is employed, for example, different levels of the data security requirements can be distinguished as follows: using a dedicated magnetic disk, using a shared magnetic disk and dedicated directories, using a shared magnetic disk and shared directories and distinguishing among different users, using a shared magnetic disk and shared directories and not distinguishing among different users. In the present embodiment, by combining the above-mentioned method for distinguishing different levels of the performance requirement and method for distinguishing different levels of the data security requirement, different isolation policies in the present embodiment can be obtained.

Generally, the lowest level of the performance requirement and the lowest level of the data security requirement among the above various levels can be provided in the training phase, because users can employ identical training data and identical analytical streams for training; whereas the lowest level of the performance requirement and the lowest level of the data security requirement among the above various levels are not provided in the scoring phase, because users usually use different input data to complete the scoring. Therefore, in the training phase and in the scoring phase, the service management module 880 can provide different number of level options on the interface provided to users.

When the service management module 880 provides, in the training phase and in the scoring phase, different number of level options, isolation policies in the present embodiment comprise at least one of analytical job isolation policy, other analytical object isolation policy, scoring job isolation policy and other scoring object isolation policy, wherein said other analytical object includes at least one of an analytical job configuration, an analytical stream and training data, said other scoring object includes at least one of a scoring job configuration, a predictive model and input data. The analytical job isolation policy includes one of the following: the user's analytical job uses dedicated analytical server physical resources; the user's analytical job uses shared analytical server physical resources and dedicated analytical server instances; the user's analytical job uses shared analytical server physical resources and shared analytical server instances and distinguishes among different users; the user's analytical job uses shared analytical server physical resources and shared analytical server instances and does not distinguish among different users.

The other analytical object isolation policy includes one of the following: the user's other analytical object uses an independent database system or an independent disks for storage; the user's other analytical object uses dedicated data tables in a shared database system or dedicated directories in a shared disk for storage; the user's other analytical object uses shared data tables in a shared database system for storage and distinguishes among different users, or uses shared directories in a shared disk for storage and distinguishes among different users; the user's other analytical object uses shared data tables in a shared database system for storage and does not distinguish among different users, or uses shared directories in a shared disk for storage and does not distinguish among different users.

The scoring job isolation policy includes one of the following: the user's scoring job uses dedicated scoring server physical resources; the user's scoring job uses shared scoring server physical resources and dedicated scoring server instances; the user's scoring job uses shared scoring server physical resources and shared scoring server instances and distinguishes among different users. The other scoring object isolation policy includes one of the following: the user's other scoring object uses an independent database system or an independent disk for storage; the user's other scoring object uses dedicated data tables in a shared database system for storage or dedicated directories in a shared disk for storage; the user's other scoring object uses shared data tables in a shared database system for storage and distinguishes among different users, or uses shared directories in a shared disk for storage and distinguishes among different users.

For example, the service management module 880 in the present embodiment can also be used to store different users' isolation policies for use by other modules. Furthermore, the service management module 880 can also be used to store configuration information of different users' isolation policies.

In the present embodiment, for the user's convenience, an interface for selection is provided to the user to allocate corresponding isolation policies to the user. In this way, it is not necessary for the user to have knowledge of particular isolation policies, and the user only needs to make his selection according to his own requirements. Furthermore, the interface provided by the service management module 880 can further include service fees, which are generated dynamically according to the user's selection, so as to facilitate the user's comprehensive consideration according to service fees and his requirements. Through automatic allocation of isolation policies and corresponding configuration information of isolation policies to users by the service management module 880, users who have different requirements can be provided with different service standards and different service fees. By providing users with diverse, multi-level services, the user experience is improved. At the same time, since the user will select partially or completely shared schemes when his requirement is not high, for the service provider, the service cost is reduced while the user requirement is satisfied.

In the present embodiment, if the user is an experienced user, it is also possible to directly provide the user with registration of isolation policies and not to display the above interface.

Hereinafter, in order to describe isolation policies provided in the present embodiment more clearly, some possible isolation policies are listed as follows for reference:

1) the user's analytical job uses dedicated analytical server physical resources and the scoring job uses dedicated scoring server physical resources, regarding analytical stream, training data in user data, analytical job configuration, an independent database system is used for storage, and regarding predictive model, scoring job configuration, input data in user data, dedicated data tables in a shared database system are used for storage;

2) the user's analytical job uses dedicated analytical server physical resources and the scoring job uses shared scoring server physical resources and dedicated scoring server instances, regarding analytical stream, training data in user data, analytical job configuration, an independent database system is used for storage, and regarding predictive model, scoring job configuration, input data in user data, dedicated data tables in a shared database system are used for storage;

3) the user's analytical job uses dedicated analytical server physical resources and the scoring job uses shared scoring server physical resources and shared scoring server instances, regarding analytical stream, training data in user data, analytical job configuration, an independent database system is used for storage, and regarding predictive model, scoring job configuration, input data in user data, dedicated data tables in a shared database system are used for storage;

4) the user's analytical job uses dedicated analytical server physical resources and the scoring job uses dedicated scoring server physical resources, regarding analytical stream, training data in user data, analytical job configuration, an independent database system is used for storage, and regarding predictive model, scoring job configuration, input data in user data, shared data tables in a shared database system are used for storage.

In the above isolation policies given in the present embodiment, when shared server instances or shared data tables are used, different users are distinguished, for example, different users can be distinguished by the job name or the file name.

According to the above isolation policies given in the present embodiment and the above different methods for distinguishing levels of the performance requirement and the data security requirement, those skilled in the art can derive more isolation policies.

Regarding the above different isolation policies, isolation types of core objects can be distinguished. For example, if dedicated server physical resources are used for a core object, the isolation type of the core object is a dedicated type; if a dedicated database system is used for a core object, the isolation type of the core object is a dedicated type; if shared server physical resources and dedicated server instances are used for a core object, the isolation type of the core object is a hybrid dedicated type; if dedicated data tables in a shared database system are used for a core object, the isolation type of the core object is a hybrid dedicated type; if shared server physical resources and shared server instances are used for a core object and different users are distinguished, the isolation type of the core object is a hybrid shared type; if shared data tables in a shared database system are used for a core object and different users are distinguished, the isolation type of the core object is a hybrid shared type; if shared server physical resources and shared server instances are used for a core object and different users are not distinguished, the isolation type of the core object is an entirely shared type; if shared data tables in a shared database system are used for a core object and different users are not distinguished, the isolation type of the core object is an entirely shared type.

The user management module 850 can query the service management module 880 for configuration information of the user's isolation policies each time the user's metadata is generated, or can obtain configuration information of the user's isolation policies in advance, so as to generate the user's metadata.

In the present embodiment, the function of the service management module 880 can also be integrated into the user management module 850.

In the present embodiment, a judgment module 840 is configured to judge the isolation type of the core object to which the intercepted request is related, according to configuration information of isolation policies, and to select to invoke the original API or to schedule the transformation module 720 or the mapping module 730 according to different isolation types. Specifically, the judgment module 840 judges the isolation type of the core object to which the intercepted request is related, according to configuration information of isolation policies, and it invokes the original API if the isolation type is a dedicated type or an entirely shared type, continues to judge the type of the request if the isolation type is a hybrid shared type or a hybrid dedicated type, schedules the transformation module 820 when the type of the request is a creation request, schedules the mapping module 830 when the request is a non-creation request.

In the present embodiment, the device 800 can further comprise an allocation module 890. The allocation module 890 is used to manage lifecycles of the interception module 810, the transformation module 820, the mapping module 830, the judgment module 840, the user management module 850, the first routing module 860 and the second routing module 870. Specifically, the allocation module 890 managing lifecycles of the above modules 810-870 comprises: generating the above modules 810-870 for each new user and allocating generated modules 810-870 to the user for exclusive use; and eliminating the above modules 810-870 when the user no longer uses analytical service. In the present embodiment, the allocation module 890 can enable different users to use their own modules 810-870, so that it can manage resources used by different users and release resources in time.

Those skilled in the art can understand that, in the present embodiment, some modules can be combined with the embodiments shown in FIGS. 4-7.

Figure 11:
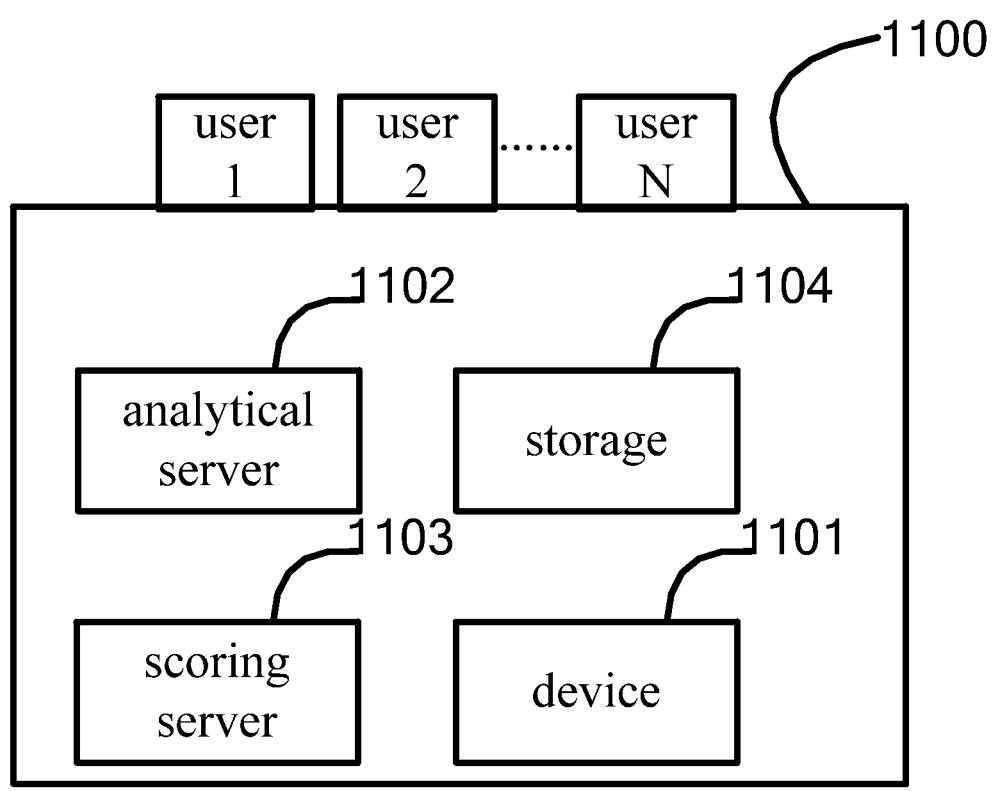
FIG. 11 depicts a structure example of a multi-user analytical system according to an embodiment of the present invention.

As shown in FIG. 11, an embodiment of the present invention also provides a multi-user analytical system 1100, which comprises a device 1101 for a multi-user analytical system described in the above embodiments as well as an analytical server 1102, a scoring server 1103, a storage 1104. The system 1100 can provide multiple users 1 . . . N with data analysis services and can also enable the multiple users 1 . . . N to share resources, thereby reducing the cost.

Figure 9:
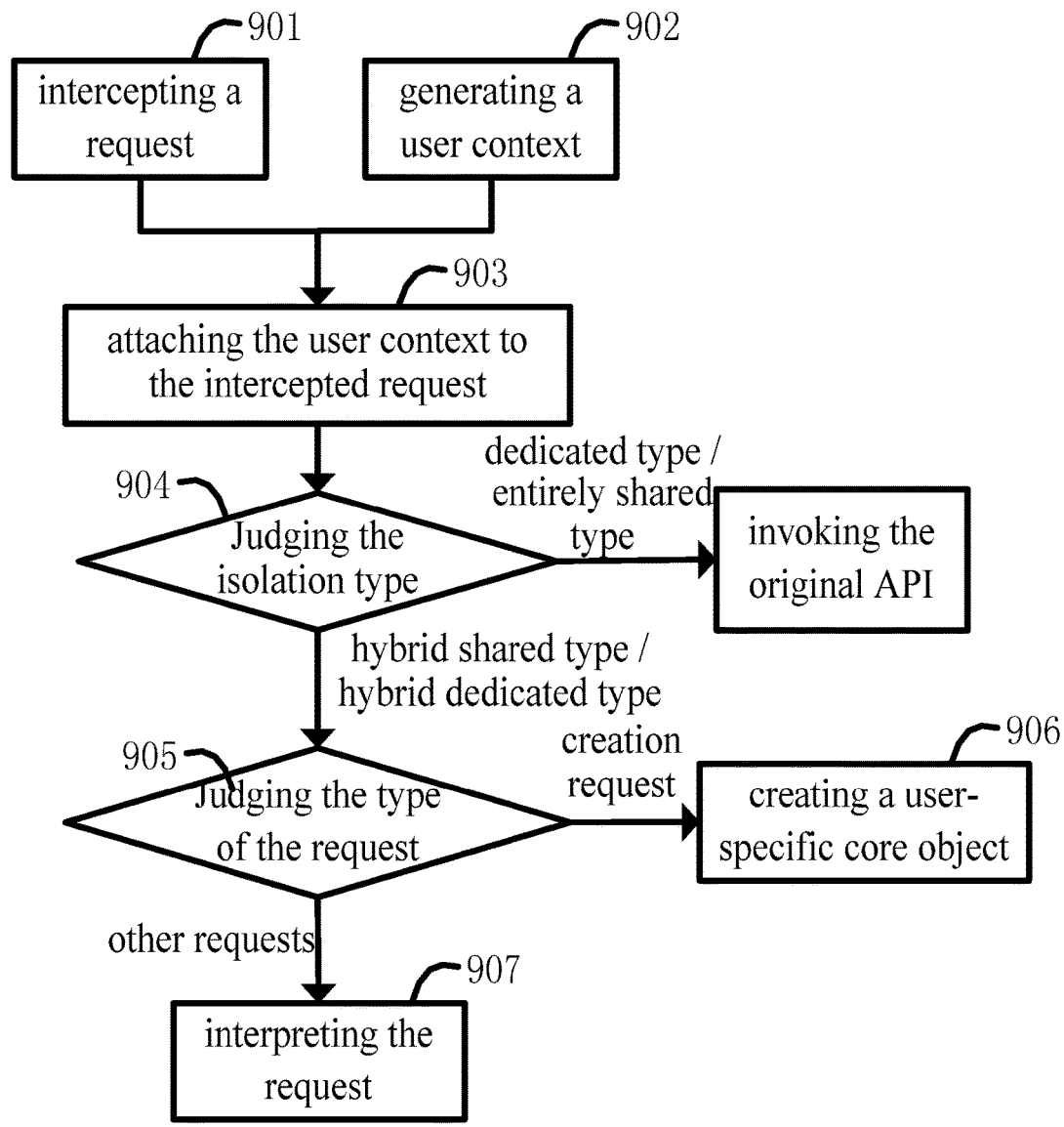
FIG. 9 depicts a flowchart of an isolation method for a multi-user analytical system according to an embodiment of the present invention.

As shown in FIG. 9, an embodiment of the present invention also provides an isolation method for a multi-user analytical system. The method comprises:

Step 901: intercepting a request for a core object;
Step 902: generating the user context of a user;

Step 903: attaching the user context to the intercepted request, wherein the user context can include user identifier and metadata of the user;

Step 904: judging the isolation type of the core object to which the request is related, according to configuration information of isolation policies in the metadata of the user, routing the request to a corresponding server or storage and invoking the original API if the isolation type of the core object is a dedicated type or an entirely shared type, or proceeding to step 905 if the isolation type of the core object is a hybrid dedicated type or a hybrid shared type;

Step 905: judging the type of the intercepted request, going to step 906 if the request is a creation request, or going to step 907 if the request is a delete, update, query, state query, execute, or list query request;

Step 906: creating a user-specific core object, and storing the user-specific core object in a storage indicated by the metadata or sending it to a server indicated by the metadata;

Step 907: interpreting the request as a request for the user-specific core object corresponding to the request.

There is no particular execution order between steps 901 and 902 in the present embodiment, and step 901 can be executed first or step 902 can be executed first or they can be executed concurrently.

Those skilled in the art can understand that, the embodiment shown in FIG. 9 can include only step 901 and step 906, corresponding to the embodiment shown in FIG. 4; the embodiment shown in FIG. 9 can include only step 901 and step 907, corresponding to the embodiment shown in FIG. 6; and the embodiment shown in FIG. 9 can include only step 901, step 906 and step 907, corresponding to the embodiment shown in FIG. 7.

The present embodiment can not comprise the judging step 905, but execute step 906 or 907 in response to different requests.

In the present embodiment, in step 906, for example, the user identifier can be attached to the core object in creating the user-specific core object, or a specific storage path can be attached to the core object, etc.

In the present embodiment, in step 906, the user-specific core object can be created according to a reference relationship between core objects, the user-specific core object containing reference to other core objects specific to the user. The particular reference relationship between core objects can refer to the device embodiment. How to create the user-specific core object according to the reference relationship between core objects and the user-specific core object contains reference to which specific other core objects can particularly refer to the device embodiment.

Detailed implementations of other steps can refer to the above device embodiment.

Figure 10:
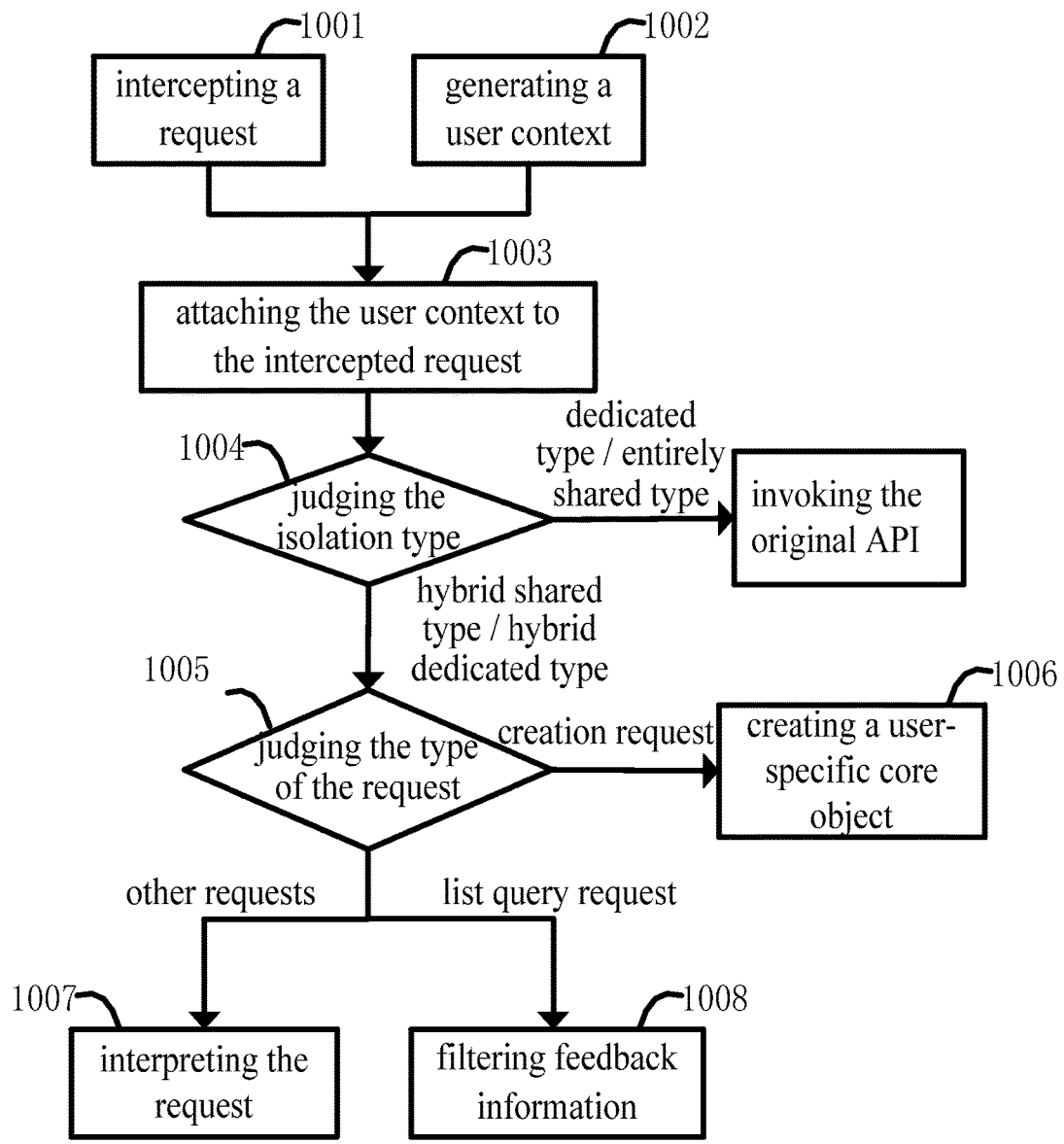
FIG. 10 depicts a flowchart of an isolation method for a multi-user analytical system according to an embodiment of the present invention.

Further, according to the embodiment shown in FIG. 10, step 1005 can be: judging the type of the intercepted request, going to step 1006 if the request is a creation request, going to step 1007 if the request is a delete, update, query, state query, or execute request, or going to step 1008 if the request is a list query request.

Step 1007 is: converting the core object to which the request is related into the user-specific core object corresponding to the request. According to the embodiment shown in FIG. 6, the more detailed implementation of step 1007 can be learned.

Step 1008 is: filtering core objects contained in the feedback information of the request so as to obtain the user-specific core object. Step 1008 can for example comprise: routing the intercepted request to a corresponding storage or server and invoking the original API, and filtering core objects contained in the feedback information so as to obtain the user-specific core object corresponding to the request. According to the embodiments shown in FIGS. 5 and 8, the more detailed implementation of step 1008 can be learned.

In the present embodiment, after step 1007, the original API can be directly invoked to perform corresponding processing on the user-specific core object.

Implementations which are not described in detail in the above method embodiments can refer to descriptions in the device embodiments.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for isolating users on a multi-user computer system, the method comprising:
intercepting a request of a user;
determining whether the request is for a core object in a group that is one of an analytical job, a scoring job, user data, an analytical stream, a predictive model, a configuration for the analytical job, and a configuration for the scoring job, the group consisting of: an analytical job, a scoring job, user data, an analytical stream, a predictive model, a configuration for the analytical job, and a configuration for the scoring job;
upon determining that the request is for the core object,
attaching a user context of the user to the request, the user context comprising a user identifier of the user and metadata of the user;
determining an isolation type of the core object using configuration information of an isolation policy in the metadata;
routing the request to a storage device identified within the metadata and invoking an Application Programming Interface (API) to process the request, if the isolation type indicates a shared database is to be used and different users are to be distinguished from one another; and
managing a first core object specific to the user, if the isolation type indicates the shared database is to be used and different users are not to be distinguished from one another; and
abandoning the request upon determining that the request is not for the core object.

2. The method of claim 1, wherein the managing comprises creating the first core object specific to the user when the request is a creation request.

3. The method of claim 2, wherein creating the first core object specific to the user comprises attaching the user identifier to the first core object.

4. The method of claim 3, further comprising storing the first core object specific to the user in the storage device indicated by the metadata.

5. The method of claim 1, wherein the managing further comprises interpreting the request as being a request for the first core object specific to the user if the request is not a creation request.

6. The method of claim 5, wherein the request is not the creation request when it is a delete, an update, or a query.

7. A method for isolating users on a multi-user computer system, the method comprising:
intercepting a request of a user;
determining whether the request is for a core object in a group that is one of an analytical job, a scoring job, user data, an analytical stream, a predictive model, a configuration for the analytical job, and a configuration for the scoring job, the group consisting of: an analytical job, a scoring job, user data, an analytical stream, a predictive model, a configuration for the analytical job, and a configuration for the scoring job;
upon determining that the request is for the core object,
attaching a user context of the user to the request, the user context comprising a user identifier of the user and metadata of the user;
determining an isolation type of the core object using configuration information of an isolation policy in the metadata;
routing the request to a storage device identified within the metadata and invoking an Application Programming Interface (API) to process the request, if the isolation type indicates only a dedicated database is be used; and
managing a first core object specific to the user, if the isolation type indicates shared server physical resources and dedicated server instances are to be used; and abandoning the request upon determining that the request is not for the core object.

8. The method of claim 7, wherein the managing comprises creating the first core object specific to the user when the request is a creation request.

9. The method of claim 7, wherein creating the first core object specific to the user comprises attaching the user identifier to the first core object.

10. The method of claim 7, further comprising storing the first core object specific to the user in the storage device indicated by the metadata.

11. The method of claim 7, wherein the managing further comprises interpreting the request as being a request for the first core object specific to the user if the request is not a creation request.

12. The method of claim 11, wherein the request is not the creation request when it is a delete, an update, or a query.

13. The method of claim 1, wherein the user data, the analytical stream, the predictive model, and the configurations belong to core objects to be permanently stored and the analytical job, the scoring job and the analytical stream belong to core objects to be only present at runtime.

14. The method of claim 1, wherein the request that is abandoned is a request for background maintenance or a request for addition of a background analysis server.

15. The method of claim 7, wherein the user data, the analytical stream, the predictive model, and the configurations belong to core objects to be permanently stored, and the analytical job, the scoring job and the analytical stream belong to core objects to be only present at runtime.

16. The method of claim 7, wherein the request that is abandoned is a request for background maintenance or a request for addition of a background analysis server.

* * * * *